United States Patent
Lo

(12) 
(10) Patent No.: US 7,257,241 B2
(45) Date of Patent: Aug. 14, 2007

(54) DYNAMIC THRESHOLDING FOR A FINGERPRINT MATCHING SYSTEM

(75) Inventor: Peter Z. Lo, Lake Forest, CA (US)

(73) Assignee: Motorola, Inc., Schaumburg, IL (US)

( * ) Notice: Subject to any disclaimer, the term of this patent is extended or adjusted under 35 U.S.C. 154(b) by 63 days.

(21) Appl. No.: 11/031,835

(22) Filed: Jan. 7, 2005

(65) Prior Publication Data

US 2006/0153433 A1 Jul. 13, 2006

(51) Int. Cl.
*G06K 9/00* (2006.01)

(52) U.S. Cl. ..................................... 382/124

(58) Field of Classification Search ................ 382/124, 382/125
See application file for complete search history.

(56) References Cited

U.S. PATENT DOCUMENTS

| | | | |
|---|---|---|---|
| 5,105,467 A | | 4/1992 | Kim et al. |
| 5,623,552 A | | 4/1997 | Lane |
| 5,648,648 A | | 7/1997 | Chou et al. |
| 5,761,330 A | * | 6/1998 | Stoianov et al. ............ 382/127 |
| 5,917,928 A | * | 6/1999 | Shpuntov et al. .......... 382/124 |
| 5,960,101 A | * | 9/1999 | Lo et al. ..................... 382/125 |
| 5,982,913 A | | 11/1999 | Brumbley et al. |
| 6,182,892 B1 | | 2/2001 | Angelo et al. |
| 6,219,439 B1 | | 4/2001 | Burger |
| 6,314,196 B1 | * | 11/2001 | Yamaguchi et al. ........ 382/125 |
| 6,487,306 B1 | * | 11/2002 | Jain et al. ................... 382/125 |
| 6,591,224 B1 | * | 7/2003 | Sullivan et al. ............ 702/179 |
| 6,993,166 B2 | | 1/2006 | Lo |
| 2004/0125993 A1 | * | 7/2004 | Zhao et al. ................. 382/124 |

OTHER PUBLICATIONS

Watson et al.; "Recognition of live-scan fingerprints with elastic distortions using correlation filters", Optical Engineering, Oct. 2004.*

Watson, et al. "Recognition of Live-Scan Fingerprints With Elastic Distortions Using Correlation Filters", OTP. ENG. 43(10) 2274-2282, Oct. 2004, Society of Photo-Optical Instrumentation Engineers.

Maltoni, et al., Biometric System Errors, ISBN 0-387-95431-7; Springer-Verlag New York, Inc. 2003.

* cited by examiner

*Primary Examiner*—Bhavesh M Mehta
*Assistant Examiner*—Jordan Kuhn
(74) *Attorney, Agent, or Firm*—Valerie M. Davis

(57) ABSTRACT

A method for use in print matching apparatus that includes the steps of: enrolling (200) a print of a user; extracting (210) a set of matching features from the enrolled print; comparing (220) the extracted features of the enrolled print to extracted features of each print in a set of reference prints, wherein each reference print in the set is from a person other than the user, and determining a highest non-matching score; determining (230) at least two minimum and maximum threshold pairs based on characteristics of the print matching apparatus; and storing (240) the matching features of the enrolled print, the highest non-matching score, and the at least two maximum and minimum threshold pairs for use in verifying a subsequently captured print of the user.

20 Claims, 3 Drawing Sheets

DYNAMIC THRESHOLDING FOR A FINGERPRINT MATCHING SYSTEM

FIELD OF THE INVENTION

The present invention relates generally to fingerprint verification systems and more specifically dynamically determining a threshold for one-to-one matching based on a quality measure and a classification determination for a candidate fingerprint.

BACKGROUND OF THE INVENTION

Biometric image-based identification/verification systems (also referred to herein as matching systems) have played a critical role in modern society in both criminal and civil applications. For example, criminal identification in public safety sectors is an integral part of any present day investigation. Similarly in civil applications such as credit card or personal identity fraud, print identification, for instance, has become an essential part of the security process. Among all of the biometrics (face, fingerprint, iris, etc.), iris and retina are the preferred biometric indicators for high security applications. However, verification systems based on fingerprints are very popular both for historical reasons and for their proven performance in the field, and facial image matching is the second largest biometric indicator used for identification.

An automatic biometric image-based identification operation, e.g., for enabling fingerprint, palm print, or facial image identification, typically consists of two stages. The first is the registration or enrollment stage, and the second is the identification, authentication or verification stage. In the enrollment stage, an enrollee's personal information and biometric image (e.g., fingerprint, palm print, facial image, etc.) is enrolled in the system. The biometric image may be captured using an appropriate sensor, and features of the biometric image are generally extracted. In the case of fingerprints, such matching features may include, but are not limited to, a classification of each print as one of four major print types (i.e., arch, left loop, right loop and whorl) as well as minutiae that have respective X-Y coordinate positions and angles of orientation as is well known in the art. The personal information and extracted features, and perhaps the image, are then typically used to form a file record that is saved into a database for use in subsequent identification or verification of the enrollee.

In the identification/verification stage, a biometric image may be captured from an individual or a latent image may be obtained. Features are generally extracted from the image and, along with personal information, are formed into what is typically referred to as a search record. The search record is then compared with the enrolled (i.e., file) record(s) in the database of the identification system. One or more matched scores are typically generated as a result of this matching process, wherein each matched score is a measurement of similarity, for example between the matching features of the identified search and file records or images. Typically, the higher the matched score, the greater the similarity is determined to be. In one to one matching, for example, to determine whether a person is a previously enrolled person, the matched score between the search and file images is compared with a pre-determined threshold (also referred to herein as a verification threshold). If the matched score is greater than the pre-determined threshold, the person's identity is verified. Otherwise, the person cannot be verified as the person he or she claims to be.

The accuracy of a biometric verification system may be characterized by two types of measurements: a true accept rate (TAR) and a false accept rate (FAR). The TAR is a measurement, which describes how accurate a system is at accepting a legitimate fingerprint, for instance, from a person. The FAR is a measurement, which describes the level at which a system accepts a false claim from a person. Thus, the goal of designing a system is to achieve a very high TAR and a very low FAR. However, there is a trade-off between these two measurements, and one cannot simultaneously maximize the performance of both TAR and FAR.

For a given verification threshold, the TAR and FAR ratio of a matching system or apparatus is fixed. For a different verification threshold, the TAR and FAR numbers may be different. Normally the higher the verification threshold, the higher TAR and FAR will be (and vice versa) for the relationship between the verification threshold and the two measurements. A Receiver Operator Characteristic (ROC) curve may be used to characterize the trade-off between TAR and FAR. An ROC curve based upon an ROC analysis is an effective method of evaluating the performance of a given system. For an image-based identification/verification system as described above, the ROC curve is defined as a plot of TAR vs. FAR. The TAR is the percentage of genuine matched pairs whose matching score on the ROC curve is greater than or equal to the verification threshold and the FAR is the percentage of non-mated pairs whose matching score on the ROC curve is less than the verification threshold.

As discussed above, the verification threshold in authentication is used to evaluate whether two prints come from the same person. The threshold for prior art image-based identification/verification systems is typically determined and set based on the desired accuracy requirement for the system and based on a single ROC curve. This verification threshold then typically remains fixed for the system. However, a single fixed threshold found on the ROC curve in the prior art may not be optimal for an image-based authentication/verification system.

For example with respect to fingerprint matching systems, unfortunately the scores from two mated prints from the same person or from different people typically vary widely in the real world. The score differences are mainly caused by differences in the matching features, including mated minutiae, extracted from the two prints. For example, a different number of minutiae may be extracted from prints captured from the same person at different times for a variety of reasons including, but not limited to, the way of the person's prints were captured, smudges in the prints, over ink, under ink, using different capture sensors at different times, etc.

Accordingly, false minutiae may be detected and some true minutiae may not be detected in a print due to poor image quality prints. Moreover, differences in extracted minutiae may result from two prints having a different classification. For example, arch type fingerprints typically have fewer average true mated minutiae than that of whorl type fingerprints. Therefore, for reasons including those discussed above the matching score for two prints from the same person can be very different from time to time, finger to finger, pattern to pattern, and person to person.

Thus, there exists a need for a biometric identification system in which a dynamic threshold for the print verification process may be determined based at least on print quality and classification characteristics of a candidate print being evaluated.

BRIEF DESCRIPTION OF THE FIGURES

A preferred embodiment of the invention is now described, by way of example only, with reference to the accompanying figures in which.

DETAILED DESCRIPTION OF THE INVENTION

Figure 1:
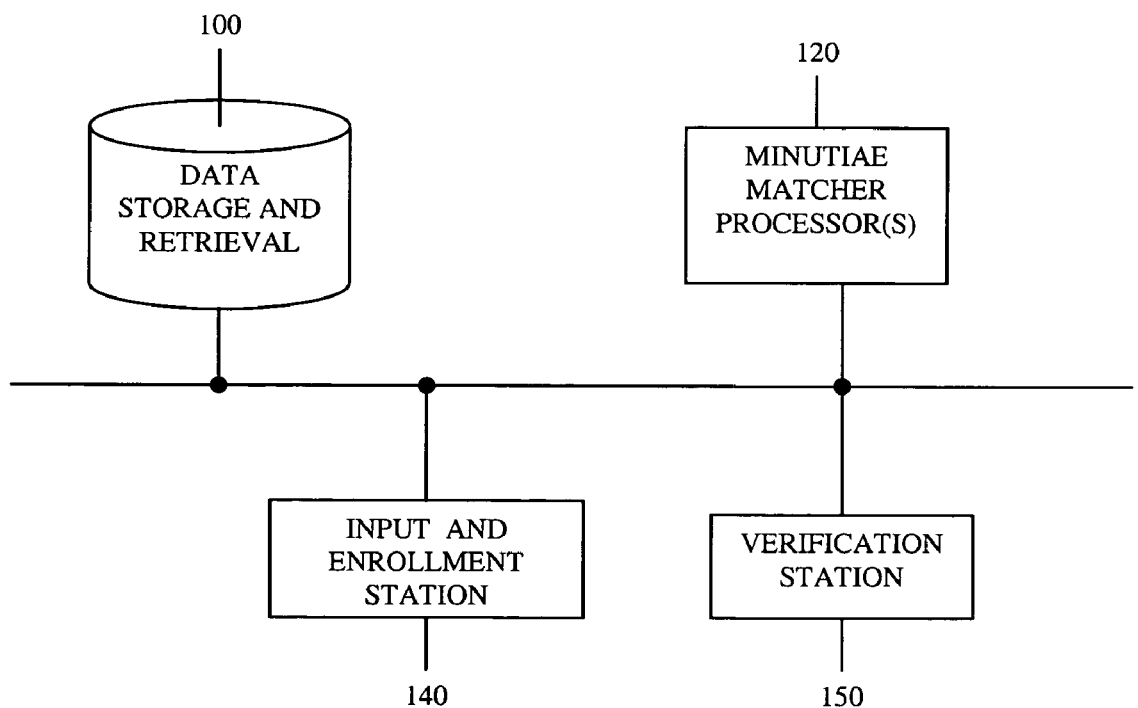
FIG. 1 illustrates a biometric matching system in accordance with an embodiment of the present invention.

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, common and well-understood elements that are useful or necessary in a commercially feasible embodiment may not be depicted in order to facilitate a less obstructed view of these various embodiments. Also, elements shown in the figures have not necessarily been drawn to scale. For example, the dimensions of some of the elements are exaggerated relative to each other. Further, where considered appropriate, reference numerals have been repeated among the figures to indicate corresponding elements.

In FIG. 1, a biometric identification system that may be used to implement the various embodiments of the present invention described herein is shown and indicated generally at 10. System 10 may be implemented as a fingerprint matching system that may be incorporated into a cellular telephone, for instance, or that may be incorporated into other applications used for biometric identification such as palm print identification and facial image identification systems. System 10 ideally includes an input and enrollment station 140, a data storage and retrieval device 100, one or more matcher processors 120, e.g., minutiae matcher processors, and a verification station 150.

The functionality of input and enrollment station 140 in accordance with the various embodiments of the present invention may be implemented, for instance, in a suitable processor programmed with instructions stored in a suitable storage or memory device, such as a Random Access Memory (RAM) or a Read Only Memory (ROM) or some combination thereof. The matcher processor(s) 120 may be any suitable matcher processor(s) that may be implemented, for instance, in a processor programmed with instructions stored in a suitable storage or memory device or in a plurality of logic devices that may be implemented in an Application Specific Integrated Circuit (ASIC), or some combination thereof. Moreover, data storage and retrieval device 100 may be any suitable storage device such as a database.

Those skilled in the art will recognize that the specifics of the illustrative example are not specifics of the invention itself and that the teachings set forth herein are applicable in a variety of settings. For example, since the teachings do not depend on the type of "prints" (or "images") being matched, they can apply to any prints/images such as toe prints, palm prints, etc., although fingerprints are described with respect to the particular embodiments described herein. As such, other alternative implementations using different types of prints/images are contemplated and are within the scope of the various teachings described herein and are within the scope of the term "print" as used herein.

Input and enrollment station 140 is used to capture one or more biometric images such as fingerprints and to optionally extract the relevant matching features of those image(s) for later comparison. Thus, input and enrollment station 140 may be coupled to a sensor such as a small sensor for capturing images, wherein the sensor area is smaller than the total area that is to be captured. The sensor may be, for instance, an optical sensor or a solid-state sensor. One or more file records (generally one file record in one-to-one matching) may also be generated in the input and enrollment station 140 from the captured image(s) and extracted features. Input and enrollment station 140 may also be configured to perform enrollment functions discussed below in accordance with various embodiments of the present invention.

Data storage and retrieval unit 100 stores and retrieves the file record(s), including the matching features, and may also store and retrieve other data useful to carry out the present invention. Matcher processors 120 use the extracted matching features of the biometric images to determine similarity or may be configured to make comparisons at the image level. One such matcher processor may be a conventional minutiae matcher for comparing the extracted minutiae of two fingerprint images or palm print image. In the case of facial image matching, the matcher process may consist of principal component analysis matching, eigen-face matching, local feature analysis matching, or other matching algorithms.

Finally, verification station 150 is used to verify matching results using a method in accordance with an embodiment of the present invention. Accordingly, verification station 150 is used to capture a biometric image such as a fingerprint and to optionally extract the relevant matching features of that image for comparison with matching features in one or more file records. Search records may also be generated in the verification station 150 from the captured images and extracted features. Thus, verification station 150 may also be coupled to the sensor for capturing search images.

It is appreciated by those of ordinary skill in the art that although input and enrollment station 140 and verification station 150 are shown as separate boxes in system 10, these two stations may be combined into one station in an alternative embodiment. Moreover, where system 10 is used to compare one search record for a given person to a plurality of file records for different persons, system 10 may optionally include a distributed matcher controller (not shown), which may include a processor configured to more efficiently coordinate the more complicated or time consuming matching processes.

Figure 2:
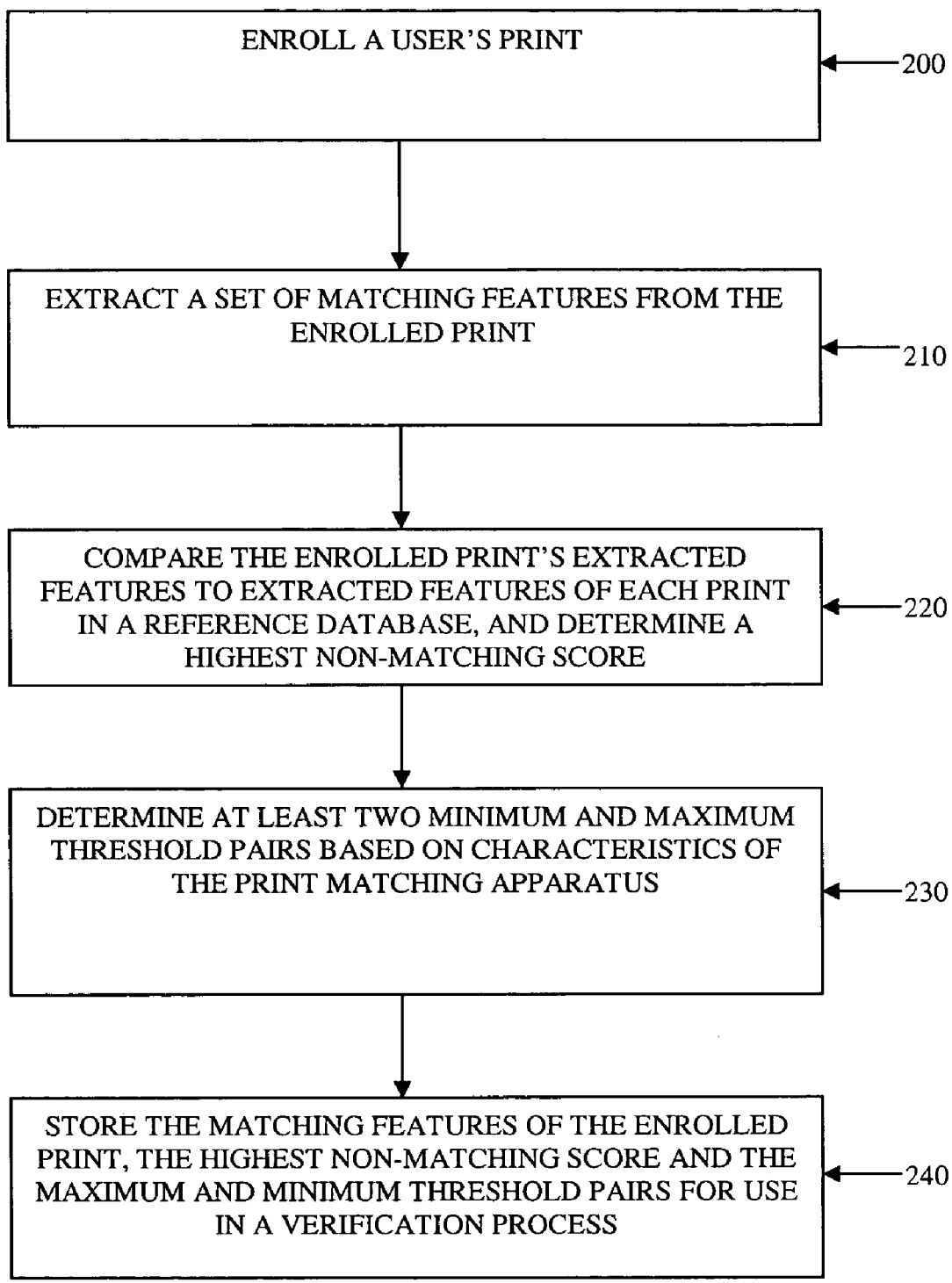
FIG. 2 illustrates a method for enrolling a fingerprint in accordance with an embodiment of the present invention.

In FIG. 2, a flow diagram of a method for biometric image enrollment in accordance with one embodiment of the present invention is shown and generally indicated. This method may be implemented in one or more processors in print matching apparatus 10 and enables one or more fingerprint images (and corresponding features) to be captured from an enrollee to facilitate efficient and accurate identification of the enrollee at some subsequent time. The method will be described in terms of fingerprint identification for ease of illustration. However, it is appreciated that the method may be similarly implemented for other types of biometric image enrollment such as, for instance, palm print or facial image enrollment. Thus, these other types of prints and images are contemplated within the meaning of the terms "print" and "fingerprint" as used in the various teachings described herein.

The method illustrated in FIG. 2, ideally, includes the steps of: enrolling (200) a print of a user; extracting (210) a set of matching features from the enrolled print; comparing (220) the extracted features of the enrolled print to extracted features of each print in a set of reference prints, wherein each reference print in the set is from a person other than the user, and determining a highest non-matching score; determining (230) at least two minimum and maximum threshold pairs based on characteristics of the print matching apparatus; and storing (240) the matching features of the enrolled print, the highest non-matching score, and the at least two maximum and minimum threshold pairs for use in verifying a subsequently captured print of the user.

During fingerprint enrollment (200), ideally at least one fingerprint image of a user is captured, and its quality is determined and compared to a pre-determined quality threshold. If the quality of the fingerprint is at least equal to the quality threshold, then a set of matching features of the print are extracted (210). The set of matching features may include, but is not limited to, a set of minutiae and classifying the print as one of a whorl, a left loop, a right loop, an arch and an unknown pattern. If the quality of the fingerprint does not meet the quality requirement as measured by the quality threshold, then another fingerprint image of the user is captured until either a fingerprint is captured that meets the quality standard or a maximum number of capture attempts has been reached. In the case where the maximum number of capture attempts has been reached, a fingerprint having the best quality of those captured is ideally enrolled.

The extracted features of the user's enrolled print is then compared (220) to the matching features of each reference print in a set of reference prints that may be, for instance, stored in a reference database either internal or external to the apparatus that includes the print matching apparatus. This reference database does not include a print from the user, i.e., all of the prints in the set of reference prints are non-mated with the enrolled print. The comparison between the enrolled print and each print in the reference database typically includes at least comparing their respective minutiae and determining a corresponding matched score. A highest score is determined from this comparison, which is the highest non-matching score. In accordance with various embodiments of the present invention, this highest non-matching score is ideally used as an initial value Tf for determining a verification threshold, as explained in detail below, that is used in the verification stage. Tf along with the matching features of the enrolled print and optionally the enrolled print is stored, for instance, in data storage and retrieval device 100.

It should be obvious to one skilled in the art of fingerprint matching systems that the size of the reference database, i.e., the number of prints in the set of reference prints, affects the highest non-matching score and directly affects the threshold Tf for the enrollee. Thus, the number of reference prints may be selected based on an accuracy requirement for the verification process, i.e., verification accuracy. In other words, by selecting a given sized database for comparison to the enrolled print, the verification accuracy is controlled since Tf will be used to determine a final verification threshold in the verification stage, as explained in detail below.

It should be further understood by those skilled in the art that it may not be practical to compare the enrolled print to, for instance, a large enough database to obtain the initial value of Tf that satisfies the accuracy requirements for the system. In this case, the Tf could be determined based on comparing the enrolled print to prints in a smaller database (i.e., having a fewer than desired number of reference prints) and then determining a Tf based on the smaller database. A highest non-matching score and corresponding Tf may then be interpolated or extrapolated from the results of the comparison with the smaller reference database using any suitable extrapolation or interpolation methodology known in the art, including for example a linear or spline method.

Ideally, prior to enrolling the user's fingerprint and matching features, characteristics of the print matching apparatus should be determined. This may be done, for instance, by generating a plurality of characteristic curves (or lists) of the print matcher apparatus. A minimum and maximum threshold pair may then be determined for each characteristic curve/list generated. The characteristic curve/list may be, for example, ROC curves/lists generated using a suitable ROC analysis as is well known in the art.

For example, to generate the ROC curves/lists N number of mated pairs of fingerprints are matched off-line using the print matcher apparatus to generate N×N matched scores. The N mated pairs of fingerprints can be obtained, for instance, wirelessly from a database external to the device that includes the print matching apparatus. Based upon the N×N matched scores, ideally a plurality of ROC curves/lists based at least on a minimum quality level for the compared pairs of prints for a group of pattern classifications are characterized.

Let us assume that there are four different quality level or measurements for the print pairs, e.g., A, B, C and D, and five different classification patterns or types, e.g., whorl, left loop, right loop, arch and unknown pattern. Thus, M=4×5=20 ROC curves/lists may be generated. A minimum and maximum threshold pair, e.g., T1 and T2, is ideally respectively determined for each of the twenty ROC curves/lists, and these minimum and maximum threshold pairs are also stored, for instance in the data storage and retrieval device 100. The threshold T1 is, for instance, a minimum score point in a ROC curve/table that satisfies the maximum false hit accuracy requirement. The threshold T2 is, accordingly, a maximum score point in the ROC curve/table that satisfies the minimum false hit accuracy requirement constraint. As detailed below, T1 and T2 are ideally used, respectively, as the lower and upper bounds for the verification threshold to enable the print matcher apparatus to have a false hit rate that satisfies a given accuracy requirement for the verification process.

Figure 3:
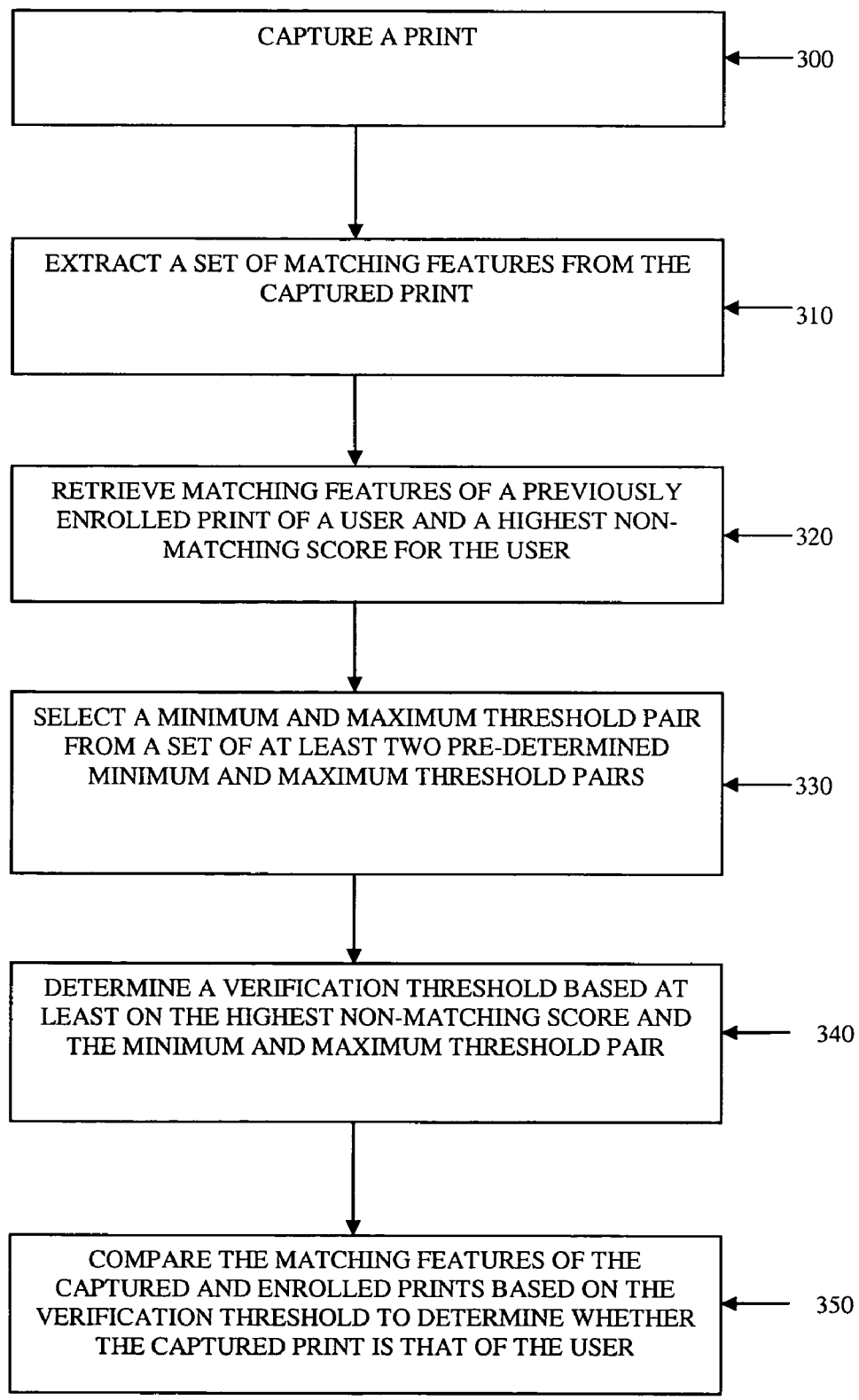
FIG. 3 illustrates a method for verifying a fingerprint in accordance with an embodiment of the present invention.

In FIG. 3, a flow diagram of a method for biometric image verification in accordance with one embodiment of the present invention is shown and generally indicated. This method may be implemented in one or more processors in print matching apparatus 10 and enables one or more candidate images (and corresponding features) to be captured from a person and compared to a previously enrolled image of a user to verify that the candidate image belongs to the previously enrolled user. This method will also be described in terms of fingerprint verification for ease of illustration. However, it is appreciated that the method may similarly be implemented for other types of biometric image enrollment such as, for instance, palm print or facial image enrollment.

The method illustrated in FIG. 3, ideally, includes the steps of: capturing (300) a print; extracting (310) a set of matching features from the captured print; retrieving (320) matching features of a previously enrolled print of a user and a highest non-matching score for the user; selecting (330) a minimum and maximum threshold pair from a set of at least two pre-determined minimum and maximum threshold pairs, wherein each minimum and maximum threshold pair is based on characteristics of the print matcher apparatus; determining (340) a verification threshold based at least on the highest non-matching score and the minimum and maximum threshold pair; and comparing (350) the matching features of the captured print to the retrieved matching features based on the verification threshold to determine whether the captured print is that of the user.

As with enrolling the initial fingerprint of the user, subsequent fingerprints for use in the verification stage are captured according to a quality requirement. Accordingly, during fingerprint capture (300), ideally at least one fingerprint image of a person is captured, and its quality is determined and compared to a pre-determined quality threshold. If the quality of the fingerprint is at least equal to the quality threshold, then a set of matching features of the captured print are extracted (310). The set of matching features may include, but is not limited to, a set of minutiae and classifying the print as one of a whorl, a left loop, a right loop, an arch and an unknown pattern. If the quality of the fingerprint does not meet the quality requirement as measured by the quality threshold, then another fingerprint image of the person is captured until either a fingerprint is captured that meets the quality standard or a maximum number of capture attempts has been reached. In the case where the maximum number of capture attempts has been reached, a fingerprint having the best quality of those captured is ideally selected for comparison to the enrolled print.

When a suitable print has been captured and its matching features extracted, the previously stored matching features of the enrolled user's print and the determined Tf (e.g., the highest non-matching score) is retrieved (320). An appropriate minimum and maximum threshold pair T1 and T2 must then be selected (330), which is ideally done based on a quality measurement (e.g., from one of the four measurements or levels listed above) and a classification type (e.g., from one of the five types listed above) for the captured and previously enrolled prints. The verification threshold will be determined (340) based on the retrieved Tf, and the selected T1 and T2. The verification threshold is also ideally determined based on a bias score, e.g., biasS, as described below.

To determine biasS, the number of minutiae in the set of minutiae for the captured or query fingerprint (e.g., q_nmin) is compared to the number of minutiae in the set of minutiae for the enrolled print (e.g., t_nmin). BiasS is determined as a function of the difference between the number of minutiae for the two prints. The function is found offline. First the query fingerprint is matched against the enrolled fingerprint to obtain a first matching score. Then the enrolled fingerprint is matched against the query fingerprint to obtain a second matching score. The difference between these two scores is calculated and normalized by the minutiae number difference between these two images. The same procedure is repeated for every query fingerprint. The statistics (e.g., mean or standard deviation) of all these normalized score difference are used to characterize the function. For example, the simplest form of the function can be (q_nmin-t_nmin) multiplied by the mean of the normalized score difference when q_nmin is greater than t_nmin. When q_nmin is less than or equal to the t_nmin, no bias will be introduced thus there's no need to correct the bias.

If the two compared prints have the same classification pattern (including known pattern to known pattern or unknown pattern to unknown pattern), the T1 and T2 pair may be retrieved according to the lowest quality of the two compared fingerprints and the common classification type. The verification threshold T may be set to f(Tf)+biasS, where f( ) is a function that may be determined by any regular parametric or non-parametric estimation as is well understood in the art. F( ) may also simply be Tf itself. Moreover, T is bounded by T1 and T2 such that if T (based on the above function for instance) is greater than T2, set T=T2, and if T (based on the above function for instance) is less than T1, set T=T1. Where the two compared prints have a different classification pattern, T can be set to Tf.

Once the verification threshold T is determined, the captured print of the person can be compared (350) to the enrolled print of the user based on T to determine whether the person can be identified as the previously enrolled user. First, a matched score S is determined between the captured and enrolled prints. Where the two prints have a common classification pattern, the matched score is generally simply determined based on the number of mated minutiae between the two prints. Where the two prints have a different classification pattern, the matched score S is ideally offset by deltaScore (i.e. S=S-deltaScore), where deltaScore is a pre-defined value that may be determined or modeled offline based on the relationship between the classification inconsistency and the matched score of matching pair of prints.

The purpose of deltaScore is to reduce the matched scores resulting from false mates of prints with different true classifications (or "classes") without causing too much of a negative impact on the matched scores resulting from the true mates of prints with different classes (e.g., where a classifier makes an error in classifying the true mates of prints). Then the S is adjusted to S-deltaScore, where deltaScore can be found by optimizing the trade-off between the probability of the false classification of true mates and the probability of the true classification of false mates using any suitable methods well known in the art.

Finally, the matched score is compared to the verification threshold T. If S>=T, then there is a match, meaning that the person can be identified as the previously enrolled user. Otherwise, if S<T, then there is no match, meaning that the verification process has determined that the person is not who he or she claims to be.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

I claim:
1. A method for use in print matching apparatus comprising the steps of:
   enrolling a print of a user;
   extracting a set of matching features from the enrolled print;
   comparing the extracted features of the enrolled print to extracted features of each print in a set of reference prints, wherein each reference print in the set is from a person other than the user, and determining a highest non-matching score;

determining at least two minimum and maximum matched score threshold pairs based on characteristics of the print matching apparatus; and storing the matching features of the enrolled print, the highest non-matching score, and the at least two maximum and minimum matched score threshold pairs for use in verifying a subsequently captured print of the user, wherein the highest non-matching score and a selected one of the minimum and maximum matched score threshold pairs are used in determining a verification threshold used in verifying the subsequently captured print of the user.

2. The method of claim 1, wherein the step of enrolling includes capturing at least one print of the user and comparing the quality of the at least one captured print to a pre-determined quality threshold for selecting one of the at least one captured prints.

3. The method of claim 1, wherein each set of matching features includes a set of minutiae.

4. The method of claim 1, wherein the set of reference prints has a first number of reference prints that is selected based on an accuracy requirement, and the highest non-matching score is based on the first number of prints.

5. The method of claim 4, wherein the highest non-matching score is based on a second number of reference prints and is generated by one of interpolating and extrapolating the results of comparing the extracted features of the enrolled print to extracted features of each print in the first number of reference prints.

6. The method of claim 1, wherein each minimum and maximum matched score threshold pair is determined from a different characteristic curve of the print matcher apparatus.

7. The method of claim 6, wherein each characteristic curve is a Receiver Operator Characteristic (ROC) curve that is generated based on a quality measure and a classification type.

8. The method of claim 7, wherein the classification type is selected from a group comprising a whorl, a left loop, a right loop, an arch and an unknown pattern.

9. The method of claim 7, wherein each minimum matched score threshold is a score point on the corresponding ROC curve that satisfies a maximum false hit accuracy requirement, and each maximum match score threshold is a score point on the corresponding ROC curve that satisfies a minimum false hit accuracy requirement.

10. A method for use in print matching apparatus comprising the steps of:
capturing a print;
extracting a set of matching features from the captured print;
retrieving matching features of a previously enrolled print of a user and a highest non-matching score for the user;
selecting one minimum and maximum matched score threshold pair from a set of at least two pre-determined minimum and maximum matched score threshold pairs, wherein each minimum and maximum matched score threshold pair is based on characteristics of the print matcher apparatus;

determining a verification threshold based at least on the highest non-matching score and the selected one minimum and maximum matched score threshold pair; and
comparing the matching features of the captured print to the retrieved matching features based on the verification threshold to determine whether the captured print is that of the user.

11. The method of claim 10, wherein each set of matching features includes a set of minutiae having a corresponding number of minutiae, the method further comprising the step of determining a bias score based on the difference between the number of minutiae in the set of matching features of the captured print and the number of minutiae in the set of retrieved matching features.

12. The method of claim 11, wherein the verification threshold is determined further based on the bias score.

13. The method of claim 12, wherein the verification threshold is set to a function of the highest non-matching score plus the bias score, bounded by the selected maximum and minimum matched score threshold pair.

14. The method of claim 11, wherein:
a normalized score difference is determined based on the difference in the number of minutiae between the matching features of the captured print and the retrieved matching features;
a normalized score difference is determined for a plurality of captured prints whose corresponding matching features are compared to the retrieved matching features; and
the bias score is determined as a function of at least one of the mean and standard deviation of all of the determined normalized score differences.

15. The method of claim 10, wherein the minimum and maximum matched score threshold pair is selected based on a quality measure and a classification determination for the captured print and the previously enrolled print.

16. The method of claim 15, wherein the classification determination is selected from a group comprising a whorl, a left loop, a right loop, an arch and an unknown pattern.

17. The method of claim 10, wherein the step of capturing includes capturing at least one print and comparing the quality of the at least one captured print to a pre-determined quality threshold for selecting one of the at least one captured prints.

18. The method of claim 10, wherein:
a matched score is generated by comparing the matching features of the captured print to the retrieved matching features;
a function of the matched score is compared to the verification threshold; and
a match is determined when the function of the matched score is at least equal to the verification threshold.

19. Print matching apparatus configured for performing the method of claim 1.

20. Print matching apparatus configured for performing the method of claim 10.

* * * * *